(12) United States Patent
Iotti

(10) Patent No.: US 9,907,428 B2
(45) Date of Patent: Mar. 6, 2018

(54) DISPENSING DEVICE WITH BARRIER PROPERTIES

(71) Applicant: Nestec S.A., Vevey (CH)

(72) Inventor: Marco Iotti, Lausanne (CH)

(73) Assignee: Nestec S. A., Vevey (CH)

( * ) Notice: Subject to any disclaimer, the term of this patent is extended or adjusted under 35 U.S.C. 154(b) by 236 days.

(21) Appl. No.: 14/772,641

(22) PCT Filed: Mar. 7, 2014

(86) PCT No.: PCT/EP2014/054444
§ 371 (c)(1),
(2) Date: Sep. 3, 2015

(87) PCT Pub. No.: WO2014/135677
PCT Pub. Date: Sep. 12, 2014

(65) Prior Publication Data
US 2016/0029832 A1    Feb. 4, 2016

(30) Foreign Application Priority Data
Mar. 7, 2013 (EP) ..................... 13158244

(51) Int. Cl.
*A47J 31/44* (2006.01)
*A47J 31/36* (2006.01)

(52) U.S. Cl.
CPC ................. *A47J 31/3642* (2013.01)

(58) Field of Classification Search
CPC ................................... A47J 31/3642
USPC ............ 99/279, 295, 289 R; 221/1, 119, 133
See application file for complete search history.

(56) References Cited

U.S. PATENT DOCUMENTS

| 6,941,855 | B2 | 9/2005 | Denisart et al. |
| 7,051,646 | B2 | 5/2006 | Della Pietra et al. |
| 2005/0061158 | A1* | 3/2005 | Della Pietra ........ A47J 31/3633 99/279 |

FOREIGN PATENT DOCUMENTS

| EP | 1247481 A1 | 10/2002 |
| EP | 1295553 A1 | 3/2003 |
| EP | 2306417 A1 | 4/2011 |
| EP | 2554081 A1 | 2/2013 |
| JP | 2011-526532 A | 10/2011 |
| WO | 2005104911 A1 | 11/2005 |
| WO | 2010001428 A2 | 1/2010 |

OTHER PUBLICATIONS

IL Application No. 240,737; Iotti, Marco; Office Action dated Apr. 14, 2016.

(Continued)

*Primary Examiner* — Thien S Tran
(74) *Attorney, Agent, or Firm* — Dunlap Codding, P.C.

(57) ABSTRACT

A device for controlled dispensing of capsules containing beverage ingredients, as well as a system and a beverage preparation machine that include the device, are disclosed. Methods of use of the device are also disclosed. In addition, a package for holding beverage ingredients containing capsules is also disclosed.

18 Claims, 8 Drawing Sheets

(56) References Cited

OTHER PUBLICATIONS

International Search Report, dated Jul. 7, 2014, in PCT/EP2014/054444, filed Mar. 7, 2014.
Written Opinion of the International Searching Authority, dated Jul. 7, 2014, in PCT/EP2014/054444, filed Mar. 7, 2014.
JP2015-560707; Nestec S. A. filed Oct. 2, 2015, Office Action dated Jan. 9, 2015.
P2015-560707; Nestec S. A. filed Oct. 2, 2015, English Translation of Office Action dated Jan. 9,2018.

* cited by examiner

DISPENSING DEVICE WITH BARRIER PROPERTIES

CROSS REFERENCE TO RELATED APPLICATIONS/INCORPORATION BY REFERENCE STATEMENT

This application is a US national stage application filed under 35 USC §371 of International Application No. PCT/EP2014/054444, filed Mar. 7, 2014; which claims benefit of EP Application No. 13158244.7, filed Mar. 7, 2013. The entire contents of the above-referenced applications are hereby expressly incorporated herein by reference.

BACKGROUND

The presently disclosed and/or claimed inventive concept(s) relates to a device for dispensing capsules containing beverage ingredients from a storage or supply means holding a plurality of capsules. In particular, the presently disclosed and/or claimed inventive concept(s) relates to a device and a method enabling the dispensing of capsules to a discharge outlet while maintaining a predefined atmospheric environment within a portion of the device and/or within the supply means.

The preparation of drinks such as coffee or tea from capsules containing a predetermined serving of beverage ingredients is well known in the prior art. Capsules have the advantage of facilitating the operations of preparing the drink, ensuring relatively clean preparation and controlling the amount and quality of the prepared product.

The principle of extracting from a capsule includes the steps of (i) enclosing the capsule in a pressure-resistant enclosure, (ii) piercing one of the faces of the capsule, generally by means of one or more spike(s) or blade(s) situated in a part comprising a water inlet or injection device, (iii) introducing a quantity of water (such as, but not limited to, hot water) into the capsule to create a pressurized environment therein to produce the liquid beverage extract, and finally (iv) releasing the liquid beverage extract through the opposite face of the capsule, which opens under the internal pressure created inside the capsule, e.g. by means of being urged against dedicated opening means.

In most commercially available extraction devices, the capsules are loaded manually or individually into the extraction capsule holder, such as by a bayonet-engagement capsule holder of the type used e.g. in traditional espresso machines.

There are also devices available which are designed for feeding the capsules from a capsule magazine to the device in order to provide a more automated arrangement and in particular an automatic delivery of the capsules to the consumer or to a beverage preparation device.

US 2005/0000366A for example proposes a device for feeding capsules containing a substance to be extracted in an extraction system under pressure for the preparation of a drink. The device includes a supply of capsules arranged in several series, and a mechanism for individually unloading one capsule directly into a reception part of the beverage extraction device, which is arranged beneath the unloading mechanism in such a way as to allow the direct descent of the released capsule into the reception part. Further, the device comprises a structure for opening the capsule and for releasing the liquid extract therefrom.

It is known that the quality of the resulting beverage strongly depends on the ingredients contained in the capsule. Thereby, in order to provide a reproducible quality of the resulting beverages, preservation of the original beverage ingredients within the capsules is an important factor. In particular, any contact of the beverage ingredients with air and specifically with oxygen results in undesired oxidation processes of the ingredients and is thus to be prevented.

Preservation of the beverage ingredients within capsules arranged in the available automated dispensing apparatus as indicated above is usually obtained by providing the individual capsule with an outer enclosing material comprising oxygen-barrier properties.

There exists however the need to use such a dispensing apparatus also in combination with capsules made from e.g. paper, cardboard or biological degradable material which are essentially gas-permeable and thus do not comprise such oxygen barrier properties.

In order to provide preservation of such capsules being made of a gas-permeable material, a secondary packaging comprising barrier properties is generally provided in which a plurality of such capsules in enclosed. This results in the drawback that after opening of the secondary packaging, no further preservation of the ingredients provided within the individual capsules is obtainable.

Therefore, a solution is sought after which enables the use of such capsules made from gas-permeable material with a capsule dispensing respectively feeding device while maintaining preservation of the ingredients contained in the individual capsules.

The presently disclosed and/or claimed inventive concept(s) aims at overcoming the above-outlined problems of the prior art. Furthermore, the presently disclosed and/or claimed inventive concept(s) aims at providing a solution to further problems identified in the description.

BRIEF DESCRIPTIONS OF THE DRAWINGS

Further features, advantages and objects of the presently disclosed and/or claimed inventive concept(s) will become apparent for the skilled person when reading the following detailed description of embodiments of the presently disclosed and/or claimed inventive concept(s), when taken in conjunction with the figures of the enclosed drawings.

Figure 8:
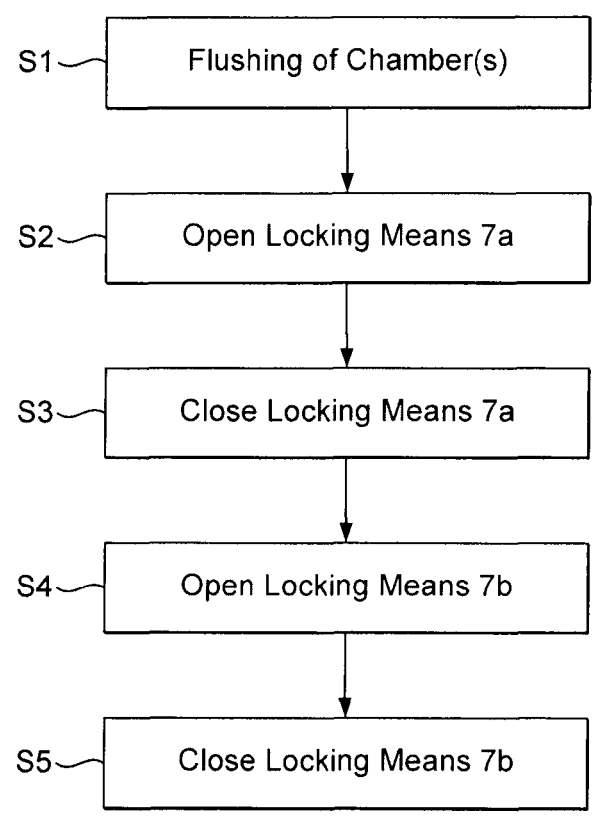

FIG. 8 relates to a chart of the method steps (of a particular non-limiting embodiment) during the discharging of the capsule from the packaging according to the presently disclosed and/or claimed inventive concept(s).

DETAILED DESCRIPTION

In a first aspect, the presently disclosed and/or claimed inventive concept(s) relates to a device for controlled dispensing of capsules containing beverage ingredients, the device comprising receiving means designed to be selectively connectable to a storage means, for example a packaging, comprising a plurality of capsules to be dispensed by the device, outlet means, such as (but not limited to) a discharge outlet, for dispensing at least one of the plurality of capsules received by the receiving means, and barrier means respectively a distribution area, arranged within a capsule transport path from the receiving means to the outlet means. In certain, non-limiting embodiments, the distribution area is designed to individually discharge a capsule from the packaging under a controlled atmospheric environment. In certain, non-limiting embodiments, the distribution area is designed for preventing transport and/or ingress of at least one of water vapour and oxygen gas from the discharge outlet to the receiving means.

In a particular, non-limiting embodiment, the barrier means respectively the distribution area is designed to provide a selectively openable water vapour and/or oxygen-barrier between the receiving means and the discharge outlet.

In certain, non-limiting embodiments, the barrier means respectively the distribution area of the device is designed for controlling an atmospheric environment within at least a portion of the distribution area. The distribution area may as well be designed for controlling an atmospheric environment within the packaging connected to the receiving means of the device.

The device thus enables the dispensing of capsules from the packaging while maintaining an oxygen-barrier and/or water vapour barrier between the discharge outlet of the device and the receiving means to which a predefined packaging for capsules is selectively connectable. Therefore, the ingress of air and/or water vapour and in particular of oxygen through the discharge outlet into a predefined portion of the device and/or into the packaging during the dispense process is prevented.

Accordingly, the device provides an enhanced storage environment for the capsules in the capsule dispensing device and/or in a predefined capsule packaging connected to the receiving means with respect to the preservation of the beverage ingredients contained in the capsules. Thereby, the device eliminates the need of providing the individual capsules with a material having gas-barrier properties.

In certain, non-limiting embodiments, the barrier means (distribution area) of the device is designed for transport of a capsule from the receiving means to the discharge outlet of the device. More particularly (but not by way of limitation), the barrier means (distribution area) is designed to enable the provision of at least one capsule per dispense process respectively one capsule at a time from the receiving means to the discharge outlet.

In certain, non-limiting embodiments, the transport of the capsule from the receiving means to the discharge outlet is carried out by dedicated capsule transport means. Thereby, in certain, non-limiting embodiments, the transport means provide a capsule transport path through the device and/or through the barrier means (distribution area). In certain, non-limiting embodiments, the transport of the capsule is supported by gravity. In certain, non-limiting embodiments, the transport path of the capsule from the receiving means to the discharge outlet is arranged within the device in an essentially vertical direction.

The transport means may comprise support means, a funnel or essentially vertically arranged conduct or tubing. The transport means may however also comprise a slide or slanted surface designed to enable a guidance of the respective capsule in a desired direction through the barrier means (distribution area) supported by means of gravity.

The barrier means (distribution area) is designed for controlling an atmospheric environment within at least a portion or predefined enclosure of the barrier means (distribution area). Thereby, the controlling of the atmospheric environment within said portion or enclosure of the barrier means (distribution area) may be carried out continuously and/or triggered by a capsule dispense operation of the device upon e.g. a user request.

The barrier means (distribution area) may further be designed for controlling an atmospheric environment within at least a second portion or predefined second enclosure of the barrier means (distribution area). Thereby, the controlling of the atmospheric environment within said second portion or enclosure of the barrier means (distribution means) may be carried out in accordance with the control of the atmospheric environment in the first portion or predefined enclosure or may differ therefrom.

It is noted that the term "atmospheric environment" respectively "controlled atmospheric environment" refers to a gaseous environment within a predefined enclosure such as e.g. a predefined portion of the distribution means respectively to a controlled gaseous environment present in such enclosure. Such portion of the distribution means may be dedicated chambers in which the atmospheric environment is present or controlled. Thereby, in certain, non-limiting embodiments, the (controlled) atmospheric environment differs from the atmospheric air in its composition. In particular, the oxygen content within the (controlled) atmospheric environment is reduced compared to the oxygen content in the atmospheric air.

In a particular, non-limiting embodiment, the barrier means (distribution area) comprises a first receiving chamber connected to the receiving means and a second dispensing chamber connected to the discharge outlet for selectively dispensing at least one capsule therefrom.

In certain, non-limiting embodiments, the barrier means (distribution area) comprises at least a first and a second locking means, each of which is designed to be selectively transferable from an open state to a closed state, independent from each other.

In the open state of the respective first or second locking means, the transfer of a capsule from a first side to a second side of the respective locking means is enabled. The respective locking means provide in their open state an aperture large enough for at least one capsule to be transported from a first side of the respective locking means to a second side thereof. In the closed state of the respective first or second locking means, the respective first or second locking means provide oxygen-barrier and/or water vapour barrier properties from a first side of the respective first or second locking means to a second side of the respective first or second locking means. The at least first and second locking means are arranged to enclose a predefined portion of the barrier means (distribution area). In a particular, non-limiting embodiment, the at least first and second locking means enclose at least the receiving chamber of the device and/or the dispensing chamber.

In a particular, non-limiting embodiment, the respective locking means provide a selectively openable barrier that connects the receiving chamber with the dispensing chamber of the device. The second locking means provides a selectively openable barrier that connects the dispensing chamber with the discharge outlet of the device.

Accordingly, the dispensing chamber provided within a capsule transport path from the receiving means to the discharge outlet of the device is enclosed by the respective first and second locking means. Thereby, in certain, non-limiting embodiments, the dispensing chamber is sized such that a single capsule is encompassed by the chamber. The dispensing and/or receiving chamber may however also be sized to encompass at least two or three capsules therein.

In certain, non-limiting embodiments, the locking means are selectively slidable doors, plates, drawers or the like. In certain, non-limiting embodiments, the locking means are arranged to be moveable in a direction essentially perpendicular to the capsule transport path from the receiving means to the discharge outlet of the device, and thus to be movable essentially perpendicular to the capsule transport path.

In certain, non-limiting embodiments, the at least first and second locking means are arranged in series within an elongated support member or capsule transport means such as e.g. a tube or funnel member, in order to selectively enclose a predefined portion or space within the support member respectively transport means.

In certain, non-limiting embodiments, the locking means are arranged within guiding means provided in the transport means of the device and designed for guiding the movement of the locking means. The guiding means may comprise sealing means such as to seal respective chambers of the barrier means (distribution area) in the closed state of the respective locking means.

The device may additionally comprise further locking means arranged in series with the first and second locking means such as to provide additional oxygen barriers and/or water vapour barriers within the capsule transport path from the receiving means to the discharge outlet.

In certain, non-limiting embodiments, the device further comprises atmospheric control means that are connected to the capsule transport path from the receiving means to the discharge outlet. The atmospheric control means may comprise a control unit which is connected to a predefined portion or enclosure of the barrier means (distribution area) in order to control or adjust the atmospheric environment within said enclosure.

In certain, non-limiting embodiments, the atmospheric control means are connected to at least the receiving chamber of the device. The atmospheric control means may as well be connected to the receiving means and the packaging when connected to the device. Further, the atmospheric control means may as well be connected to the dispensing chamber of the device.

The atmospheric control means may comprise flushing means designed to enable a flushing of the predefined portion, enclosure or chamber with a gaseous medium of predefined composition. In certain, non-limiting embodiments, the flushing means comprise an injection valve and a relief valve.

The atmospheric control means may be designed for enabling flushing the predefined portion, enclosure or chamber of the device to which they are connected with inert gas such as to remove any oxygen content therefrom. In particular, an excess of inert gas is provided to the predefined portion, enclosure or chamber such that any remaining oxygen gas is expelled through the relief valve.

In certain, non-limiting embodiments, the inert gas used for flushing is nitrogen gas. However, any other inert gas may be utilized. In certain, non-limiting embodiments, a supply container for providing inert gas is selectively connectable to dedicated receiving means of the device. The supply container may thus be selectively connected to the atmospheric control means of the device.

The atmospheric control means may further comprise a sensor arranged within the respective predefined portion, enclosure or chamber of the device such as to detect the presence of oxygen.

It is noted that, in certain, non-limiting embodiments, the device according to the presently disclosed and/or claimed inventive concept(s) comprises a dedicated capsule secondary packaging for holding a plurality of capsules therein and designed for being selectively connectable to the receiving means of the device.

It is noted that the term "plurality" of capsules" is to be understood as referring to at least two individual capsules arranged within the packaging. In a particular, non-limiting embodiment, 3 to 20 capsules are arranged within the packaging.

By means of the device according to the presently disclosed and/or claimed inventive concept(s), preservation of the beverage ingredients held within the capsules stored in the connected packaging or within a predefined portion of the barrier means (distribution area) is enhanced, irrespective of the material used for the individual capsules. Accordingly, even ingredients held within capsules made from gas-permeable material such as cardboard or biodegradable material may be protected from reaction with oxygen during storage.

In a further aspect, the presently disclosed and/or claimed inventive concept(s) relates to a beverage preparation machine for preparing a beverage upon injection of liquid into a beverage ingredients containing capsule. The beverage preparation machine comprises a device for controlled dispensing as described above.

In certain, non-limiting embodiments, the dispensing device is arranged in such a way with respect to a brewing chamber of the beverage preparation machine, such that the capsule may be provided directly from a discharge outlet of the dispensing device into the brewing chamber of the beverage preparation machine.

In a further aspect, the presently disclosed and/or claimed inventive concept(s) relates to a packaging for holding a plurality of ingredients containing capsules.

As outlined above, the term "plurality" of capsules" in this regard is to be understood as referring to at least two individual capsules arranged within the packaging. In a particular, non-limiting embodiment, 3 to 20 capsules are arranged within the packaging.

In certain, non-limiting embodiments, the packaging is made from material comprising gas (oxygen and/or water vapour) barrier properties such as e.g. polyethylene, polypropylene, EVOH, a multilayer-structure comprising oxygen barrier properties or aluminium.

In certain, non-limiting embodiments, the packaging comprises at least one outlet aperture designed for being connected to receiving means of a dispensing device for controlled dispensing of capsules held by the packaging, wherein the outlet aperture is hermetically sealed with a closure material, such as (but not limited to) a closure member, comprising oxygen-barrier properties.

In certain, non-limiting embodiments, the packaging is designed to interact with dedicated receiving means of a capsule dispensing device as described above, in order to open the closure member at the outlet aperture upon insertion and/or connection of the packaging with the receiving means provided at the dispensing device.

The receiving means of the dispensing device may comprise specifically designed opening members which are adapted to open and seal the outlet aperture of the packaging when connecting the packaging to the receiving means, such as to prevent the ingress of oxygen into the packaging.

In a particular, non-limiting embodiment, the closure member of the packaging for closing the at least one outlet aperture is formed by at least a portion of a first capsule being arranged in vicinity of the outlet aperture of the packaging.

In a further aspect, the presently disclosed and/or claimed inventive concept(s) relates to a method for controlled dispensing of beverage ingredients containing capsule from storage means, in particular a packaging, in which a predefined atmospheric environment is present, comprising the steps of:
- transferring a capsule from the storage means, such as (but not limited to) a packaging, to a receiving chamber or a dispensing chamber,
- transferring the capsule from the receiving chamber or the dispensing chamber to a discharge outlet,
- controlling an atmospheric environment within the receiving chamber and/or the dispensing chamber such that transport and/or ingress of at least one of oxygen gas and water vapour from the discharge outlet to the storage means is prevented.

In certain, non-limiting embodiments, the method further comprises the step of selectively opening and closing barrier means such as oxygen and/or water vapour barrier means, arranged in the transfer path of the capsule between the storage means, i.e. the packaging, the receiving chamber and/or the dispensing chamber and the discharge outlet in a predefined pattern.

In certain, non-limiting embodiments, the step of controlling an atmospheric environment with the receiving chamber and/or the discharge chamber is carried out continuously, before, and/or after opening a transfer path of the capsule between the storage means and the receiving chamber.

Furthermore, the controlling of the atmospheric environment with the receiving chamber and/or the dispensing chamber may further comprise the step of detecting an oxygen content within the receiving chamber and/or the dispensing chamber, e.g. by means of a dedicated sensor, and adjusting the atmospheric environment within the receiving chamber and/or the dispensing chamber according to predefined values depend on the detected oxygen content.

The step of controlling the atmospheric environment may comprise the removal and/or supply of gaseous media from/to the receiving chamber and/or the dispensing chamber.

In a particular, non-limiting embodiment, the step of controlling an atmospheric environment comprises the step of flushing the receiving chamber and/or the dispensing chamber with inert gas, such as (but not limited to) nitrogen, such as to remove any oxygen therefrom.

Figure 1:
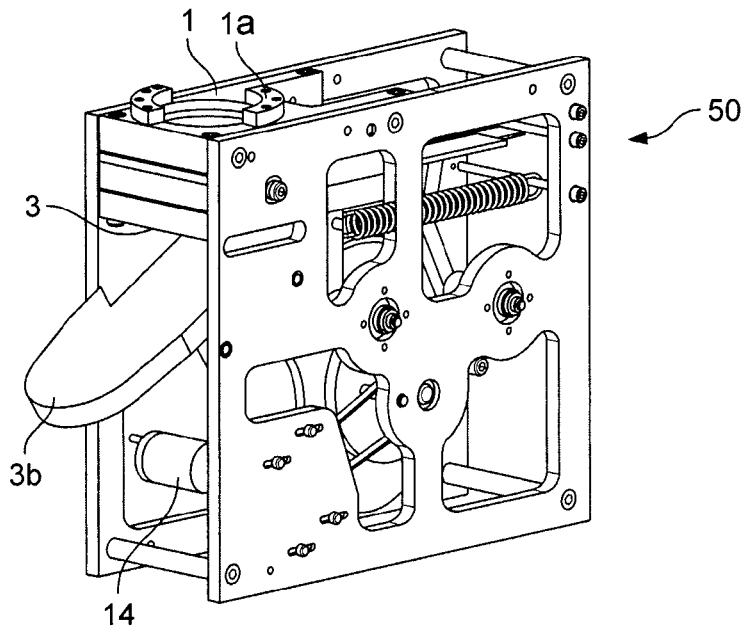
FIG. 1 shows a perspective side view of a particular, non-limiting embodiment of the device according to the presently disclosed and/or claimed inventive concept(s).
Figure 2:
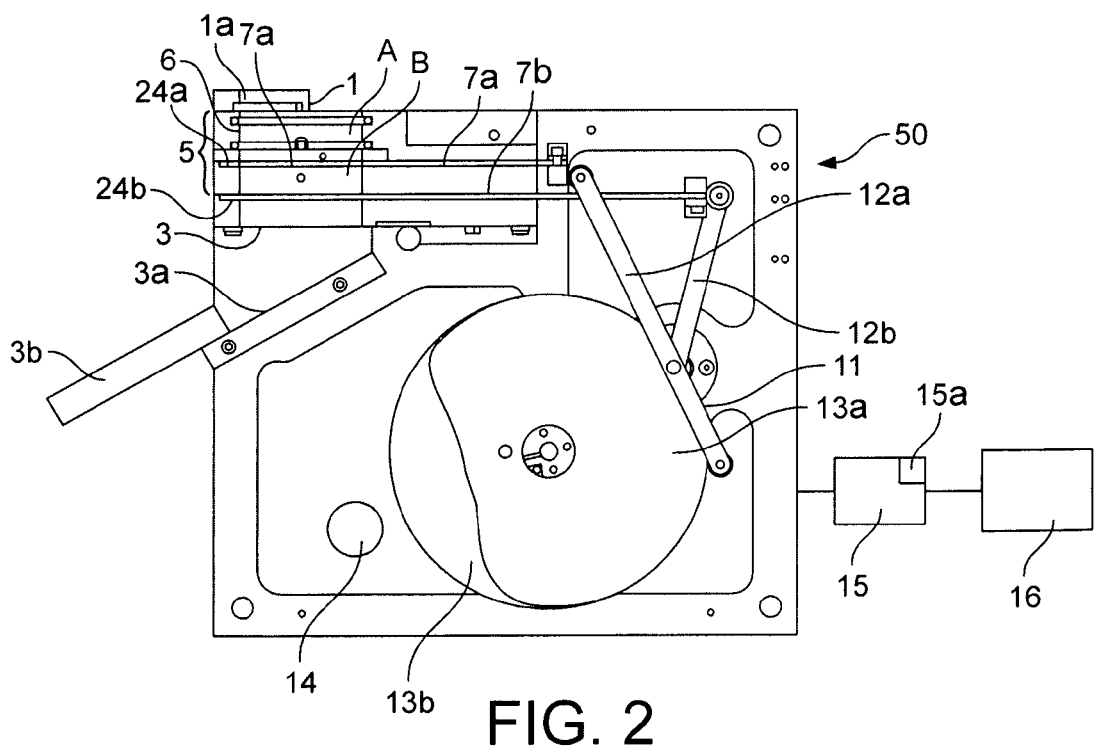
FIG. 2 shows a particular, non-limiting embodiment of the device according to the presently disclosed and/or claimed inventive concept(s) in sectional side view.

Turning now to the Drawings, FIG. 1 shows a schematic drawing of a particular, non-limiting embodiment of a capsule dispensing device 50 according to the presently disclosed and/or claimed inventive concept(s). FIG. 2 refers to the embodiment according to FIG. 1 and shows a sectional side view thereof.

As shown in FIGS. 1 and 2, the device 50 comprises receiving means 1 design to be selectively connectable to storage respectively supply means 20 (see e.g. FIG. 6), in particular a secondary packaging 20. In certain, non-limiting embodiments, the receiving means 1 comprise engagement means 1a which are designed to interact with an outlet aperture or opening 1b of a packaging 20 (see FIG. 7a). In certain, non-limiting embodiments, the engagement means 1a comprise a screw thread, snap-fit member or other suitable means for connecting a packaging 20 to the receiving means 1.

The engagement means 1a may further comprise an opening member such as a circular cutting member which is designed to open respectively cut or pierce a portion of the packaging 20, such as a portion of an outlet aperture thereof.

Figure 4:
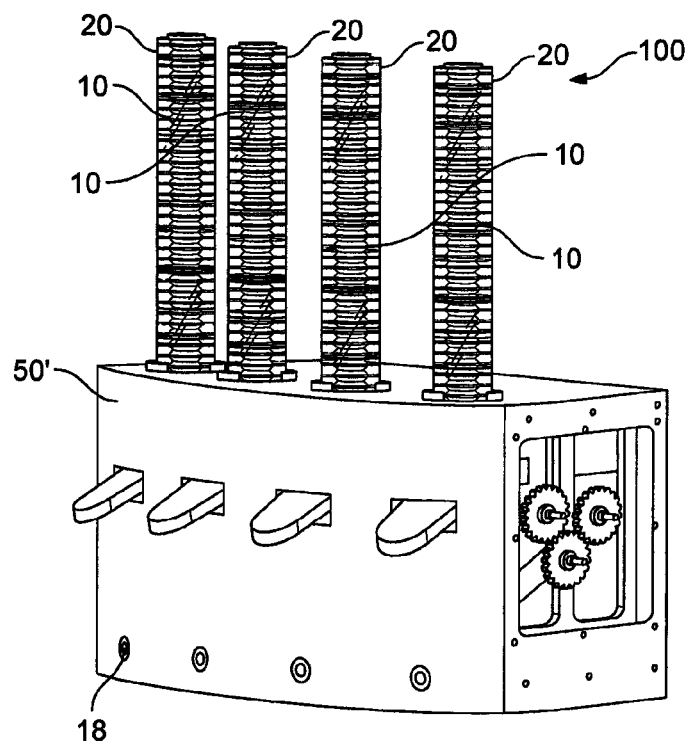
FIG. 4 shows a perspective side view of a particular, non-limiting embodiment of a dispensing machine comprising multiple dispensing devices according to the presently disclosed and/or claimed inventive concept(s).
Figure 5:
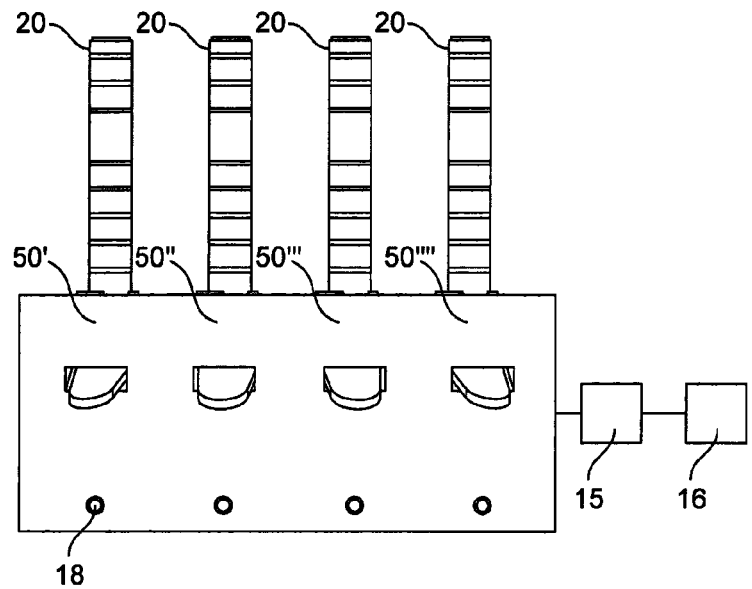
FIG. 5 shows a schematic front view of the machine according to FIG. 4.

In certain, non-limiting embodiments, the receiving means 1 are shaped to receive a capsule 10 from the packaging 20 when connected to the receiving means 1 as shown e.g. in FIGS. 4 and 5. Thereby, in certain, non-limiting embodiments, the receiving means 1 comprise a circular aperture through which beverage ingredients containing capsules 10 enclosed within the packaging 20 may be fed to the device 50.

The receiving means 1 are connected to a capsule transport means 6 which are designed for enabling a transport of the capsule through the device. In certain, non-limiting embodiments, the transport means 6 comprise a tubular member arranged essentially vertical in the device 50 such as to transport the capsule 10 provided by the packaging 20 through the device 50 and in particular towards a capsule discharge outlet 3 of the device 50. In certain, non-limiting embodiments, the inner diameter of the tubular member 6 is slightly larger than the outer diameter of a capsule 10 such that transport through the tubular member under the effect of gravity is enabled. The transport means 6 may as well comprise an inclined surface or slanted portion by means of which the respective capsules 10 may be fed from the packaging 20 to the discharge outlet 3 of the device under the effect of gravity.

Between the receiving means 1 and the discharge outlet 3, barrier means (distribution area) 5 is arranged which is designed to prevent transport and/or ingress of gas and in particular of oxygen gas from the discharge outlet 3 to the receiving means 1. The barrier means (distribution area) 5 may additionally or alternatively be designed for preventing transport and/or ingress of water vapour from the discharge outlet 3 to the receiving means 1.

The barrier means (distribution area) 5 comprises a receiving chamber A which is connected to the receiving means 1. In certain, non-limiting embodiments, the barrier means (distribution area) 5 further comprises a dispensing chamber B which is connected to the discharge outlet 3 and the receiving chamber A.

In the particular, non-limiting embodiment as shown in FIGS. 1 and 2 (as well as FIGS. 7a-7d), the receiving chamber A and the dispensing chamber B are arranged in series between the capsule receiving means 1 and the discharge outlet 3 of the device 50. The receiving chamber A and the dispensing chamber B are arranged within the tubular member 6 of the device.

In certain, non-limiting embodiments, the receiving chamber A is selectively connectable to respectively separable from the dispensing chamber B by means of a first locking means 7a.

Furthermore, in certain, non-limiting embodiments, the device 50 comprises at least a second locking means 7b which are arranged between the dispensing chamber B and the discharge outlet 3 of the device. By means of these second locking means 7b, the dispensing chamber B is selectively connectable to respectively separable from the discharge outlet 3.

The device 50 may further comprise additional locking means which are arranged in the capsule transport path form the receiving means 1 to the discharge outlet 3.

In certain, non-limiting embodiments, the locking means 7a,7b each comprise a sliding mechanism such as a slidable door portion arranged essentially perpendicular to the orientation of the capsule transport means 6. In certain, non-limiting embodiments, the locking means 7a,7b are guided by dedicated guiding means 24a,24b such as e.g. grooves formed in the tubular member 6 of the capsule transport means. Thereby, in certain, non-limiting embodiments, the grooves 24a,24b are equipped with sealing means such that at least in the closed position of the respective locking means 7a,7b, air and in particular oxygen gas is prevented from being transported through the grooves 24a,24b from a first side of the respective locking means 7a,7b to an opposite second side of the respective locking means 7a,7b.

The device further comprises a driving mechanism 11 connected to the barrier means 5 (distribution area). In certain, non-limiting embodiments, the driving mechanism 11 comprises a cam arrangement such as first and second cam disk 13a,13b connected to levers 12a,12b which are connected to the locking means 7a,7b. The driving mechanism thus enables a controlled operation of the locking means 7a,7b. The driving mechanism 11 further comprises a motor 14 coupled to the cam disks 13a,13b.

In certain, non-limiting embodiments, the driving mechanism 11 is arranged to enable a movement of the at least first and second locking means 7a,7b independent from each other. In an alternative, the movement of the first and second locking means 7a,7b is controlled such that opening respectively closing of the respective locking means 7a,7b is carried out according to a predefined pattern.

In the arrangement as shown in FIG. 2, the first locking means 7a connected to lever 12a is in its extended respectively closed position, in which the locking means 7a interact with the guiding grooves 24a to prevent any transport of gas and/or water vapour from the receiving chamber A to the dispensing chamber B and vice versa.

In FIG. 2, the second locking means 7b is shown in its retracted respectively open position, in which a capsule held within dispensing chamber B may be transferred towards an discharge outlet 3 of the device 50. In particular, in case a capsule 10 was held within the dispensing chamber B and the locking means 7b are brought into the shown open position, the capsule 10 will fall through the discharge outlet 3 arranged below the dispensing chamber B.

The device further comprises atmospheric control means 15 coupled to the barrier means (distribution area) 5. Thereby, in certain, non-limiting embodiments, the atmospheric control means 15 are coupled to the receiving chamber A and/or dispensing chamber B such as to enable the control of the atmospheric environment enclosed therein.

In certain, non-limiting embodiments, the atmospheric control means 15 comprise a valve means 40a,40b (see FIG. 7a) which are designed for provision of inert gas such as e.g. nitrogen gas to at least the reviving chamber A and/or dispensing chamber B of the barrier means 5 (distribution area). Thereby, the control means 15 are connected to a supply of inert gas such as e.g. a gas tank 16 selectively connectable to the device 50 (see schematic drawing FIGS. 2 and 5).

In certain, non-limiting embodiments, the control means 15 comprise a pump (15a) arranged between the supply 16 and the barrier means 5 (distribution area) in order to selectively provide inert gas to the barrier means 5 (distribution area).

The control means 15 may as well comprise at least one relief valve 40b (see FIG. 7a) connected to the barrier means (distribution area) 5 in order to enable any excess gas to leave a predefined portion of the barrier means (distribution area) 5. In particular, the relief valve may be arranged within the receiving chamber A and/or the receiving chamber B.

In certain, non-limiting embodiments, the control means 15 are designed to enable a flushing of the receiving chamber A and/or of the dispensing chamber B by means of inert gas such as nitrogen.

Thereby, at least the receiving chamber A as well as the dispensing chamber B may be equipped with input valves 40a such as to provide inert gas into the respective chamber A,B. Furthermore, at least the receiving chamber A may be equipped with a relief valve 40b such as to enable a flushing of receiving chamber A and/or the packaging connected thereto with inert gas. In addition, the dispensing chamber B may as well be equipped with a relief valve 40b such as to enable the provision of excess inert gas to the dispensing chamber B and remove any residual oxygen gas therefrom by means of the relief valve.

In certain, non-limiting embodiments, the tubular member 6 and the locking means 7a,7b which enclose the respective chambers A,B are made from a material which is essentially gas impermeable, such as e.g. aluminium.

The tubular member 6 may further comprise dedicated sealing means which close the respective chamber A and/or B in an essentially gas-impermeable manner at least in the closed state of the respective locking means 7a,7b.

In particular, the receiving chamber A which is selectively separable from the dispensing chamber B is designed such that any ingress of gas such as e.g. oxygen gas and/or water vapour is prevented in the closed state of the first locking means 7a.

In certain, non-limiting embodiments, the receiving chamber A is connected to the receiving means 1 of the device in direct fluid communication, i.e. without any additional barrier means respectively locking means arranged therebetween. Alternatively, there may be additional locking means arranged between the receiving means 1 and the receiving chamber A such as to provide selectively openable oxygen and/or water vapour barrier means between these two parts of the device 50.

Figure 3:
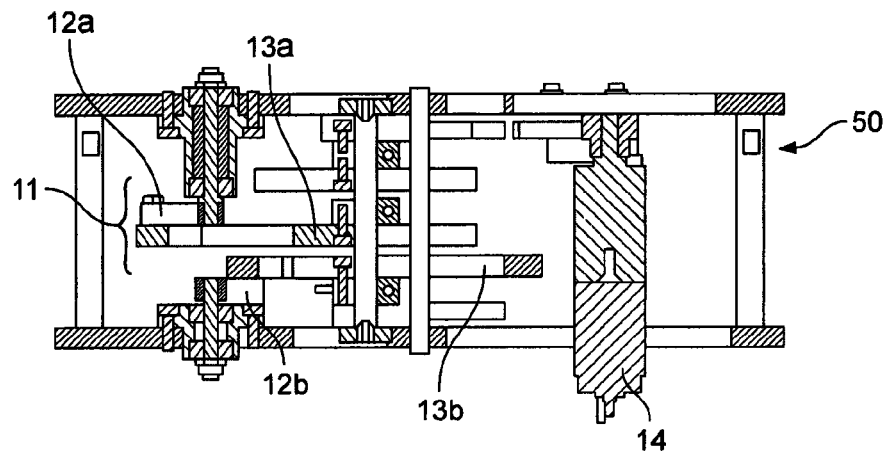
FIG. 3 shows a sectional top view of a particular, non-limiting embodiment of the presently disclosed and/or claimed inventive concept(s) according to FIGS. 1 and 2.

A particular, non-limiting embodiment of the discharge process is explained in the following with regards to FIGS. 1 to 3, as well as the detailed FIGS. 7a to 7d: A packaging 20 is connected to the receiving means 1 with the aid of engagement means such as e.g. a screw connection or a bayonet-type connection 1a,1b. Thereby, the packaging 20 may initially be kept closed, i.e. the packaging 20 which itself is made of a material with oxygen barrier properties may not immediately be opened upon being connected with the receiving means 1.

For sealing the interior of the packaging 20 when connected to the device, the receiving means 1 may comprise a sealing member, such as at least one O-ring 30. When the packaging 20 is connected to the receiving means, the O-ring 30 is urged against an outer surface of the packaging 20 (see FIG. 7a).

In a next step, the receiving chamber A which is connected to the receiving means 1 and which is separated from the dispensing chamber B by means of closed locking means 7a may be flushed with inert gas such as nitrogen to remove any excess oxygen from the receiving chamber A. Accordingly, a predefined atmospheric environment is established in the receiving chamber A only containing inert gas such as nitrogen. As a next step, opening means arranged at or in vicinity of the receiving means 1 may be activated in order to open the packaging 20 connected to the receiving means 1. Upon opening of the packaging 20, in certain, non-limiting embodiments, the capsules contained therein are urged downwards under the effect of gravity such that at least one capsule is placed within the receiving chamber A.

As an alternative to the above-indicated connection process of the packaging 20 to the device 50, the packaging 20 may be designed to be opened upon connection with the device 50 e.g. by means of a bayonet-type connection mechanism 1a,1b. Thereby, after connecting the packaging 20 to the device, the atmospheric control means 15 connected to at least receiving chamber A may be activated such as to flush the receiving chamber A and the packaging 20 by means of excess inert gas such as to remove any oxygen from the receiving chamber A and the packaging 20 connected thereto.

Figure 7A:
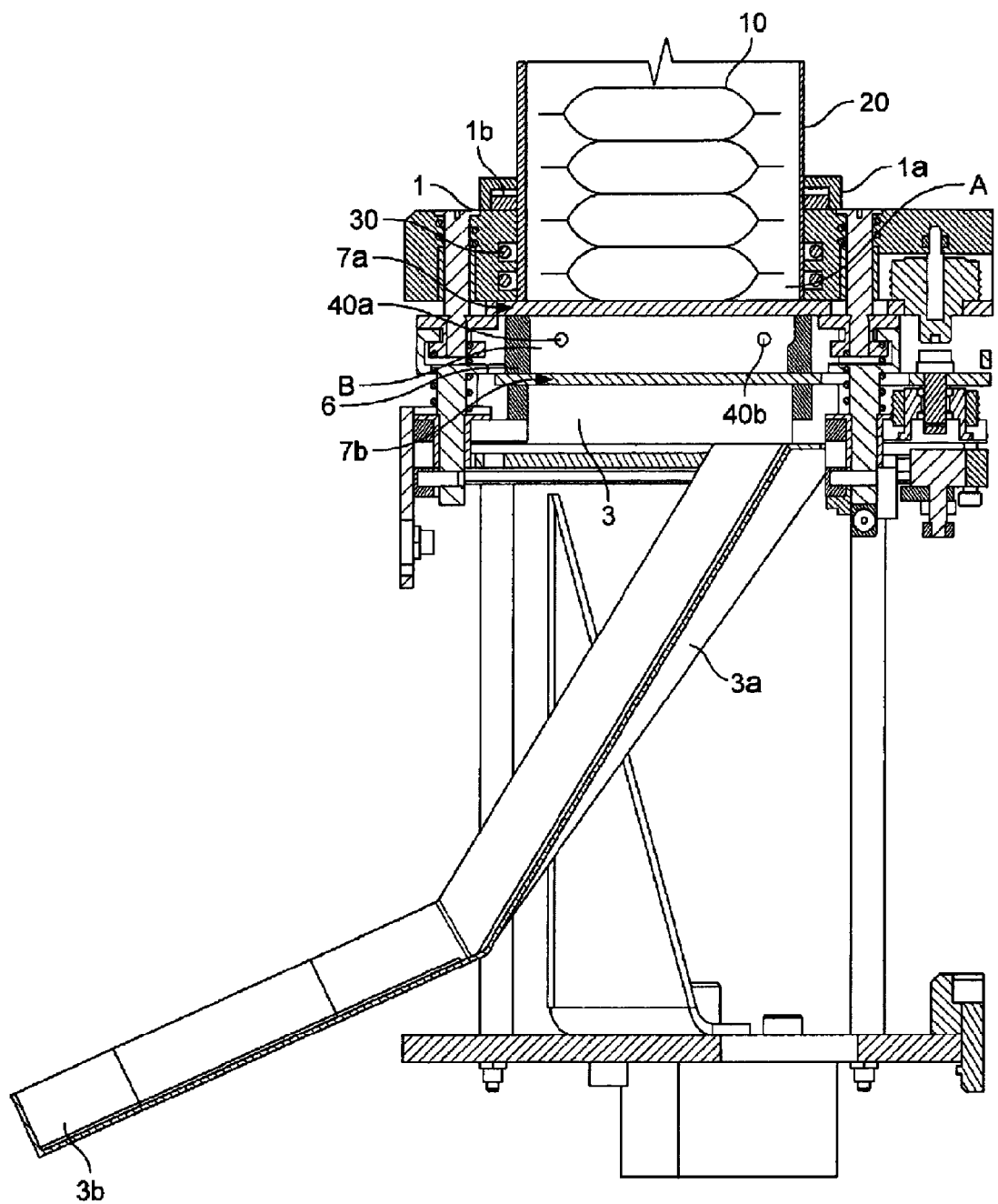
FIGS. 7a to 7d show a detailed illustration of the distribution area of the device according to the embodiment shown in FIGS. 1-3.

In a next step, the driving mechanism 11 may be activated such as to close the locking means 7b which are separating the dispensing chamber B from the discharge outlet 3, if they are not already in their closed state. FIG. 7a shows such particular (but non-limiting) initial state, in which the packaging 20 is connected to the receiving means 1 and wherein the locking means 7a and 7b are in their closed position.

Further, in order to remove any oxygen content from the dispensing chamber B, the atmospheric control means connected to said dispensing chamber B are controlled to provide excess of inert gas such as nitrogen to said second chamber in order to remove any oxygen content therefrom. This is in particular obtained by dedicated flushing of the chamber B as outlined above with respect to the receiving chamber A. In particular, the inert gas is introduced via an injection valve 40a. For removing excess of air respectively oxygen from chamber B, a relief valve 40b may be (in certain, non-limiting embodiments) arranged within chamber B. It is noted that for the same purpose, receiving chamber A may be additionally equipped with an injection and/or relief valve 40a,40b.

Thus, a predefined atmospheric environment is obtained also in said dispensing chamber B. Thereby, in certain, non-limiting embodiments, the locking means 7b are also designed to prevent any gas and in particular any oxygen gas and/or water vapour to pass from the discharge outlet 3 into the dispensing chamber B.

Figure 7B:
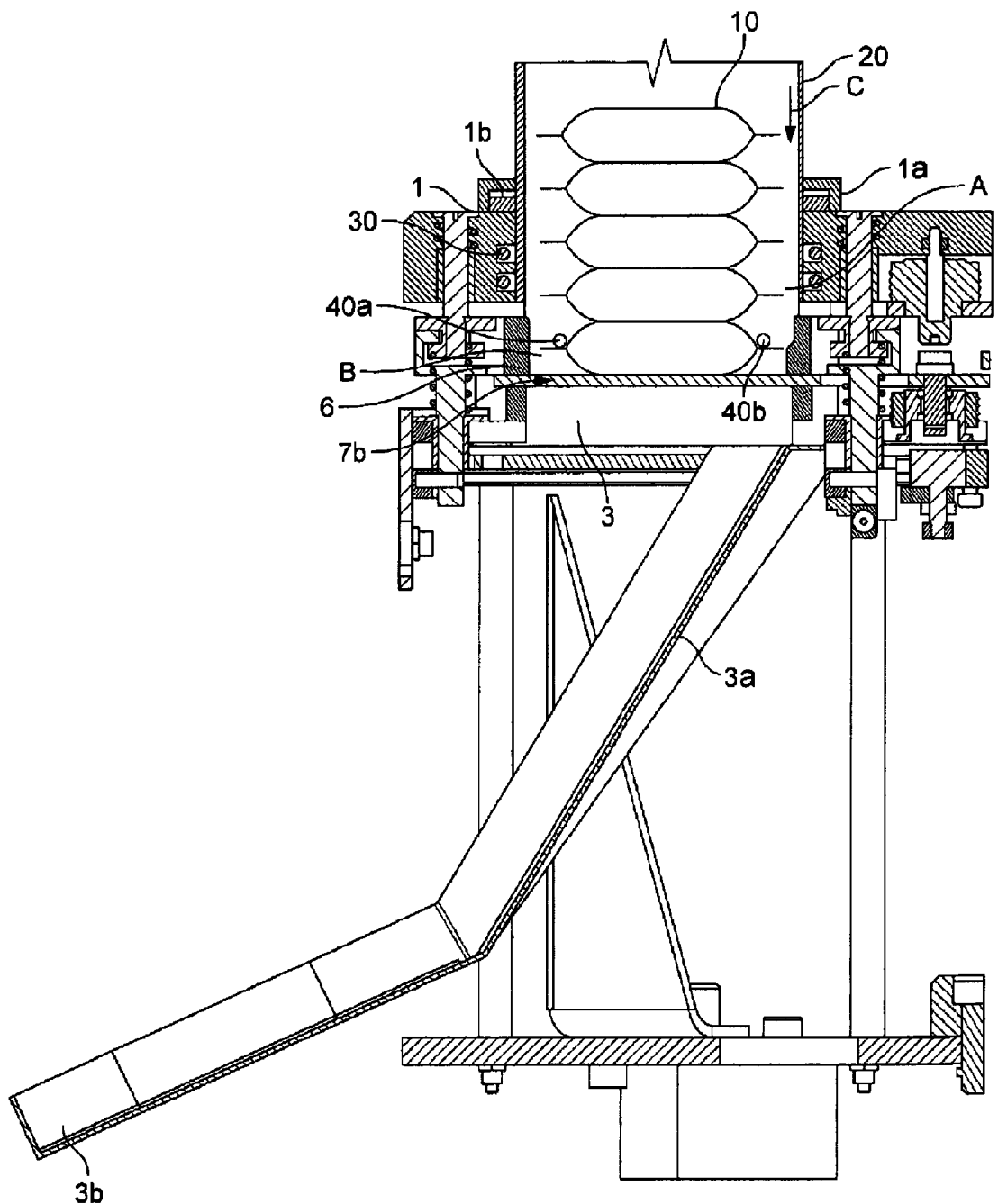

As depicted in FIG. 7b, the first locking means 7a is now opened such that at least one capsule may be transferred from the receiving chamber A to the dispensing chamber B, supported by the capsule transport means 6 of the device and/or by gravity (see Arrow C in FIG. 7b). In a particular, non-limiting embodiment, the dispensing chamber B is sized to accommodate at least one capsule, as shown in FIG. 7b.

Figure 7C:
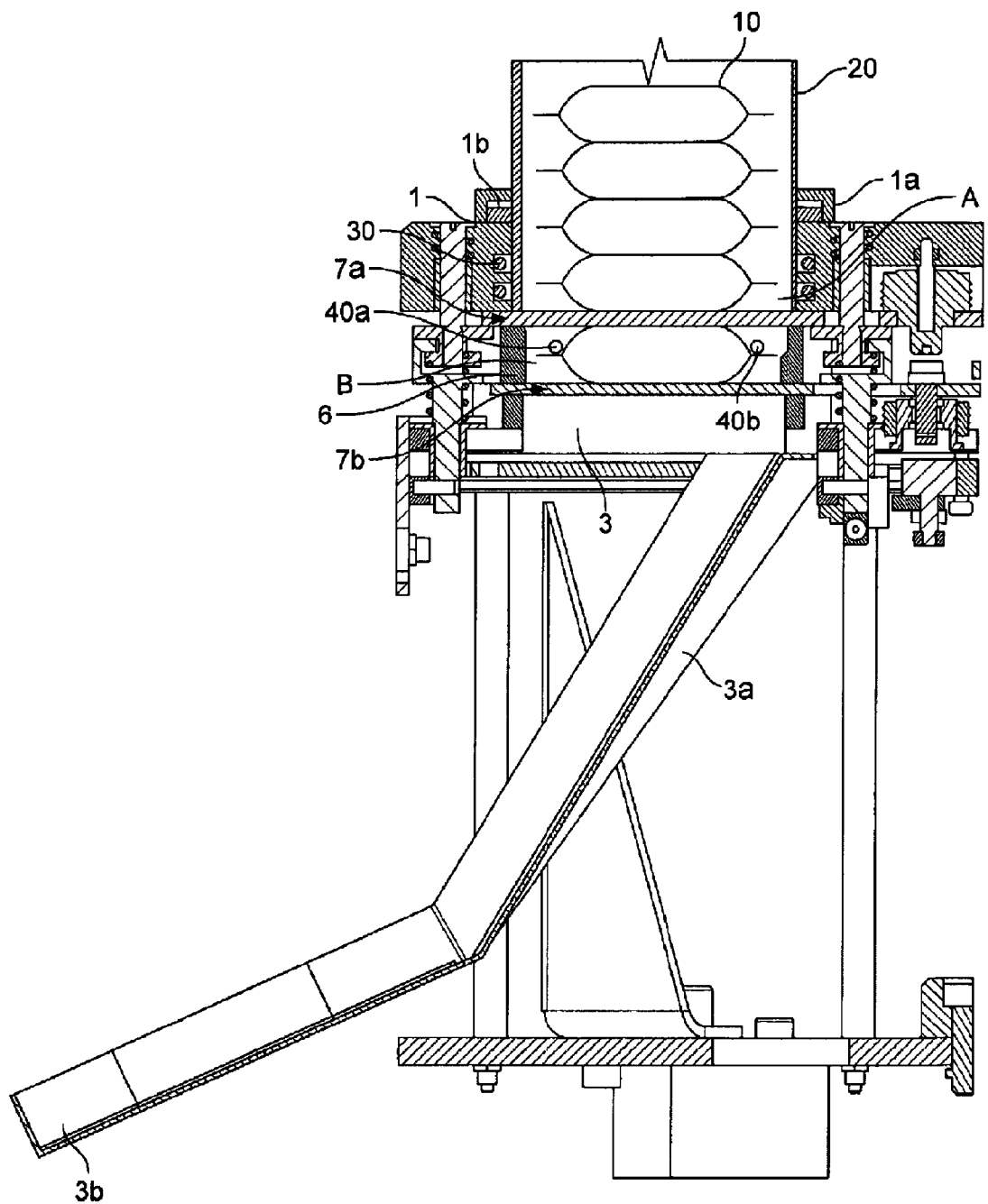

Then, as shown in FIG. 7c, the locking means 7a are closed again such as to provide an oxygen and/or water vapour barrier between the receiving chamber A and the dispensing chamber B. Thereby, any succeeding capsules which may be automatically fed through the transport means 6 of the device towards the dispensing chamber B are kept within the packaging 20 respectively within the receiving chamber A, as the locking means 7a cuts off the transport path between the respective chamber A and B.

Figure 7D:
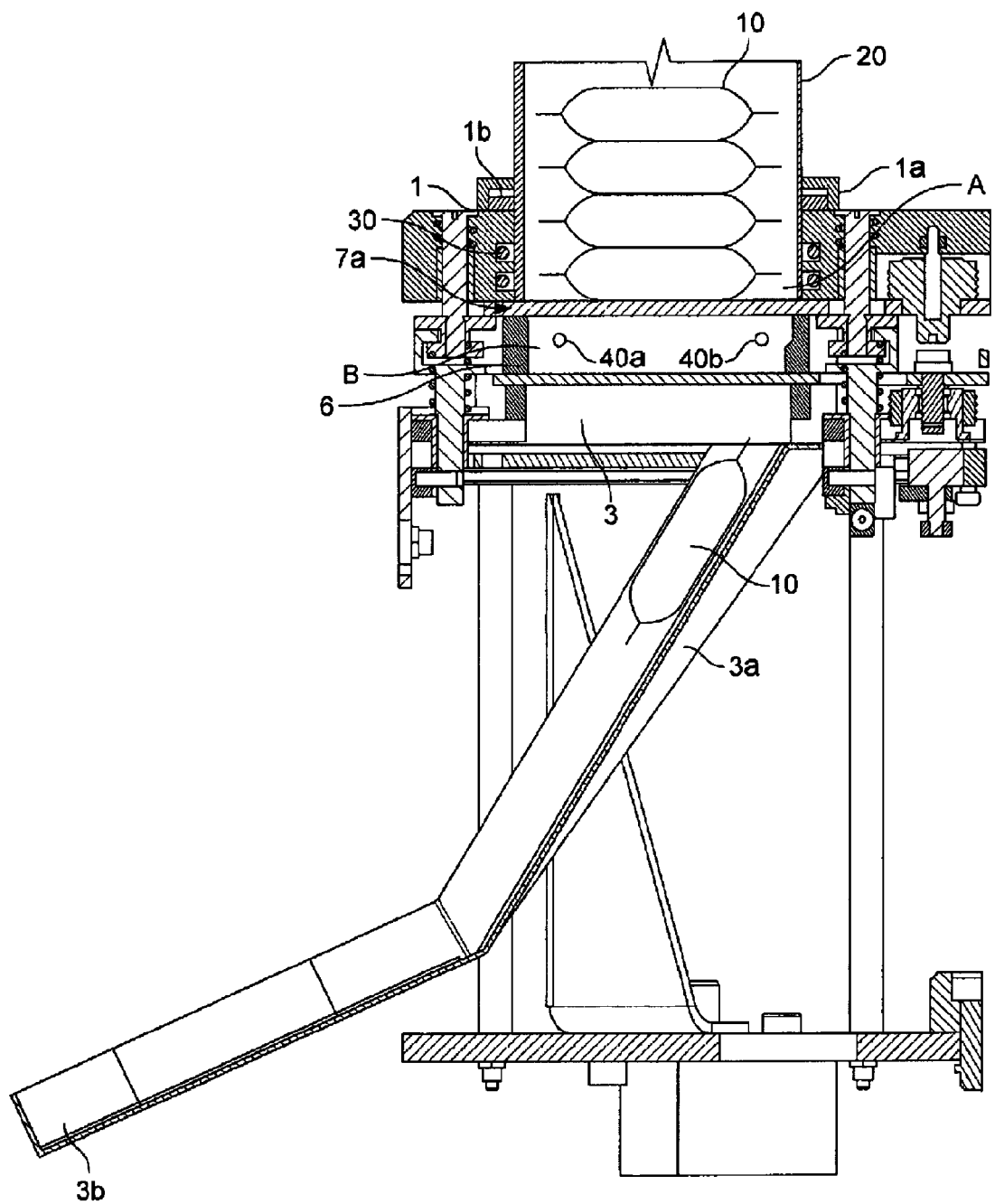

In a further step as shown in FIG. 7d, the locking means 7b are brought into their open position in order to open a capsule transport path from the dispensing chamber B to the discharge outlet 3 of the device. The capsule is thus made to exit the discharge outlet 3 of the device. The discharge outlet 3 may comprise a slide and/or a support member 3a which transports the capsule from the outlet 3 towards a collecting portion 3b. A consumer may then collect the dispensed capsule 10 from the collecting portion 3b.

Alternatively, the dispensing device may be arranged in combination with a beverage preparation machine such that the dispensed capsule 10 is transferred from the discharge outlet 3 directly into a brewing chamber of the machine.

In a further step, the locking means 7b may be reclosed such as to prevent fluid flow from the discharge outlet 3 to the dispensing chamber B.

It is noted that the atmospheric control means 15 are, in certain, non-limiting embodiments, adapted for providing inert gas to the respective chamber in response to opening and/or closing of the respective locking means and/or in response to a user request for a dispense process of a dedicated capsule 10.

Furthermore, the atmospheric control means 15 may be adapted to continuously monitor and/or adjust the atmospheric environment within at least the receiving chamber A and within the packaging 20 connected thereto by provision of inert gas.

FIGS. 4 and 5 show a further particular (but non-limiting) embodiment of a dispensing machine according to the presently disclosed and/or claimed inventive concept(s). In certain, non-limiting embodiments, the machine 100 comprises 4 dispensing devices 50'-50'''' as previously described with reference to FIGS. 1 to 3. Thereby, in certain, non-limiting embodiments, the dispensing devices are equipped with packaging containers 20 each holding different types of capsules such as to provide a variety among which the consumer may choose.

As shown in FIGS. 4 and 5, the inventive device 50 may comprise a dedicated user interface comprising at least a dispense button or activation means 18 suitable for initiating a dispense process of a capsule from the packaging 20 to the discharge outlet 3 of the respective device.

Figure 6:
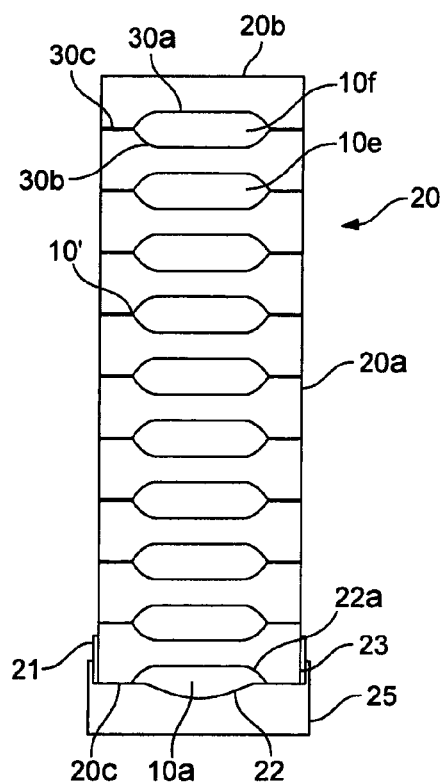
FIG. 6 shows a schematic drawing of a packaging or supply means selectively connectable to the dispensing device according to the presently disclosed and/or claimed inventive concept(s).

FIG. 6 relates to a storage means 20 respectively a packaging which comprises a plurality of capsules 10a-10f enclosed therein.

In certain, non-limiting embodiments, each of the capsules 10 comprises a first and second respectively an inlet and outlet face 30a,30b which are sealed together at a circumferential outer rim portion 30c, thereby enclosing a predefined portion of beverage ingredients.

In certain, non-limiting embodiments, the packaging 20 is made of an outer material comprising gas such as oxygen and/or water vapour barrier properties, such as e.g. polyethylene, polypropylene, EVOH, a multilayer-structure comprising oxygen barrier properties or aluminium.

In certain, non-limiting embodiments, the capsules 10a, 10',10e,10f are arranged within the packaging in a stacked arrangement as indicated in FIG. 6.

In certain, non-limiting embodiments, the packaging 20 comprises a tubular member 20a having a closed bottom portion 20b and an opening 20c.

In certain, non-limiting embodiments, the packaging is hermetically closed by arranging a closing member 22 to cover the opening 20c. Within the packaging in the closed state, a predefined atmospheric environment is present. Thereby, in certain, non-limiting embodiments, the packaging is essentially void of any oxygen. In certain, non-limiting embodiments, the packaging 20 in its initial state is filled with inert gas such as e.g. nitrogen.

In certain, non-limiting embodiments, the closing member 22 is sealed to an outer rim portion of the opening 20c. Thereby, usual techniques such as thermo-welding may be applied to establish a connection between the closing member 22 and the rim portion or boundary portion of opening 20c.

The closing member 22 comprises oxygen and/or water vapour barrier properties such as to prevent oxygen from being transported into the packaging 20 in the closed state thereof.

In a particular, non-limiting embodiment, the closing member 22 is made from e.g. aluminium, polyethylene, EVOH or a multilayer-structure comprising such oxygen barrier properties. In certain, non-limiting embodiments, the closing member 22 is an integral part of a first capsule 10a stored within the packaging 20. Thereby, the closing material presents an outer face 30b of the capsule.

In certain, non-limiting embodiments, the first capsule 10a is made completely from said material providing oxygen and/or water vapour barrier properties. Alternatively, the closing member 22 is constituted by a first face of the capsule 10a, whereby a second face 22a is made from oxygen-permeable material.

In certain, non-limiting embodiments, the connection between the closing member 22 and the packaging 20 is designed to be disengaged or cut during connection of the packaging 20 with dedicated receiving means 1 of the dispensing device 50. Alternatively or in addition, the receiving means 1 may comprise opening means which enable the disengagement of the first capsule 10a from the packaging 20, whereby the sealed connection between said first capsule 10a and the packaging 20 is disengaged. Accordingly, the first capsule 10a may directly be transferred from the packaging 20 into the receiving means 1 and thus urged towards a receiving chamber A of the device when the packaging 20 is connected to the receiving means 1.

In addition, in certain, non-limiting embodiments, the packaging 20 comprises connection means 21 such as e.g. an outer screw thread 1b (see FIG. 7a) or means for interacting with a bayonet-type connection member 1a of the device 50 by means of which the packaging 20 may be connected with the receiving means 1 of the device 50.

Furthermore, the packaging 20 may as well be equipped with a cap 25 such as to protect the opening 20c from unintentional opening during handling, transport and/or storing thereof. The cap 25 may be removably connected to the packaging 20 such as e.g. by means of the connection means 21 arranged at the vicinity of the opening 20c.

The cap 25 may be made of gas (oxygen) barrier material and/or water vapour barrier material such as e.g. polyethylene, polypropylene, EVOH, a multilayer-structure comprising oxygen barrier properties or aluminium.

FIG. 8 depicts particular (but non-limiting) method steps S1 to S5 during the discharging process of a capsule 10 from packaging 20.

In a first step S1, flushing of the chambers A,B with excess inert gas, such as (but not limited to) nitrogen, is carried out by means of injection valve(s) 40a and relief valve(s) 40(b) connected to the atmospheric control means 15 (see FIG. 2). In a particular, non-limiting embodiment, only dispensing chamber B is flushed with excess inert gas. During this flushing step S1, in certain, non-limiting embodiments, chamber B is void of any capsule and the first and second locking means 7a,7b are in an initial closed position (see FIG. 7a).

In a next step S2, the locking means 7a are opened, which leads to a transport of a single capsule from the multiple-capsule holding packaging 20 to the receiving chamber B (see FIG. 7b) due to gravity. Due to the controlled atmosphere being present within packaging 20 and chamber B, the opening of locking means 7a separating chamber B from receiving chamber A and the packaging 20 does not lead to any ingress of oxygen gas or water vapour from the capsule discharge outlet 3 to the receiving means 1 of the device.

In step S3, the locking means 7a are closed again in order to enclose capsule 10 within the dispensing chamber B of the device as depicted in FIG. 7c.

In step S4, the locking means 7b selectively separating chamber B and discharge outlet 3 are opened in order to release capsule 10 from chamber B as depicted in FIG. 7d.

In step S5, the locking means 7b are closed again in order to separate chamber B from discharge outlet 3.

In a possible variant of the method according to the presently disclosed and/or claimed inventive concept(s), upon connection of packaging 20 to the receiving means 1 of device 50, steps S1 and S2 may be replaced by a step S1' and step S2'. Thereby, during step S1' opening of the locking means 7a takes place (while locking means 7b is held in its initial closed position). Accordingly, a first capsule 10 of the packaging 20 will be transferred from the packaging 20 and receiving chamber A to dispensing chamber B. In next step S2', chamber B, chamber A and packaging 20 connected thereto are flushed with excess inert gas. In certain, non-limiting embodiments, this may be carried out by injection valve 40a and relief valve 40b connected to chamber B. Accordingly, the controlled atmospheric environment within packaging 20 and chamber A is maintained respectively ensured after connection of the packaging 20 to receiving means 1 of the device. The following steps S3 to S5 correspond to the method steps as described above.

Although the presently disclosed and/or claimed inventive concept(s) has been described with reference to particular non-limiting embodiments thereof, many modifications and alternations may be made by a person having ordinary skill in the art without departing from the scope of this presently disclosed and/or claimed inventive concept(s) which is defined by the appended claims.

The invention claimed is:

1. A device for controlled dispensing of capsules containing beverage ingredients, the device comprising:
   receiving means designed to be selectively connectable to a packaging comprising a plurality of capsules to be dispensed by the device;
   outlet means for dispensing at least one of the plurality of capsules received by the receiving means; and
   barrier means arranged within a capsule transport path from the receiving means to the outlet means and designed for preventing transport and/or ingress of at least one of water vapour and oxygen gas from the outlet to the receiving means, wherein the barrier means comprises:
   a first receiving chamber connected to the receiving means; and
   a second dispensing chamber connected to the outlet means for selectively dispensing at least one of the plurality of capsules.

2. The device according to claim 1, wherein the barrier means are designed to individually discharge a capsule from the packaging under a controlled atmospheric environment.

3. The device according to claim 1, wherein the barrier means are designed for controlling an atmospheric environment within at least a portion of the barrier means.

4. The device according to claim 1, wherein the device further comprises atmospheric control means designed for adjusting an atmospheric environment within at least a portion of the barrier means.

5. The device according to claim 4, wherein the atmospheric control means are connected to the first receiving chamber and/or to a second dispensing chamber of the device.

6. The device according to claim 4, wherein the atmospheric control means are designed for flushing at least a portion of the barrier means with inert gas to remove any oxygen therefrom.

7. A device for controlled dispensing of capsules containing beverage ingredients, the device comprising:
   receiving means designed to be selectively connectable to a packaging comprising a plurality of capsules to be dispensed by the device;
   outlet means for dispensing at least one of the plurality of capsules received by the receiving means; and
   barrier means arranged within a capsule transport path from the receiving means to the outlet means and designed for preventing transport and/or ingress of at least one of water vapour and oxygen gas from the outlet to the receiving means, wherein the barrier means comprises at least a first and second locking means, each of which is designed to be selectively transferable from an open state to a closed state, independent from each other.

8. The device according to claim 7, wherein the first and second locking means are arranged in a capsule transfer path from the receiving means to the outlet means of the device.

9. The device according to claim 7, wherein the barrier means are designed to individually discharge a capsule from the packaging under a controlled atmospheric environment.

10. The device according to claim 7, wherein the barrier means are designed for controlling an atmospheric environment within at least a portion of the barrier means.

11. The device according to claim 7, wherein the device further comprises atmospheric control means designed for adjusting an atmospheric environment within at least a portion of the barrier means.

12. The device according to claim 11, wherein the atmospheric control means are connected to the first receiving chamber and/or to a second dispensing chamber of the device.

13. The device according to claim 11, wherein the atmospheric control means are designed for flushing at least a portion of the barrier means with inert gas to remove any oxygen therefrom.

14. A system comprising:
   a device according to any one of claims 1-13; and
   a packaging designed for selectively connected to the receiving means of the device, the packaging enclosing a plurality of capsules and being made from a material having oxygen and/or water vapour barrier properties.

15. A beverage preparation machine for preparing a beverage upon injection of liquid into a beverage ingredients containing capsule, the beverage preparation machine comprising:
   a device according to any one of claims 1-13, wherein the outlet means of the device are arranged to deliver a capsule to a beverage brewing chamber of the beverage preparation machine.

16. A method for controlled dispensing of a beverage ingredients containing capsule from a packaging in which a predefined atmospheric environment is present, the method comprising the steps of:
   transferring a capsule from the packaging to a receiving chamber,
   transferring the capsule from the receiving chamber to a dispensing outlet; and
   controlling an atmospheric environment within at least the receiving chamber such that transport and/or ingress of at least one of water vapour and oxygen gas from the dispensing outlet to the packaging is prevented, comprising the step of flushing the receiving chamber with inert gas to remove any oxygen and/or water vapour therefrom.

17. The method according to claim 16, wherein the method further comprises the step of selectively opening and closing oxygen and/or water vapour barrier means arranged in the transfer path of the capsule between the packaging, the receiving chamber and the dispensing outlet in a predefined pattern.

18. The method according to claim 16, wherein the step of controlling an atmospheric environment with the receiving chamber is carried out continuously and/or before opening a transfer path of the capsule between the packaging and the receiving chamber.

* * * * *